Feb. 17, 1942.	F. C. BURT	2,273,176
FLOOR HEATER
Filed March 25, 1940
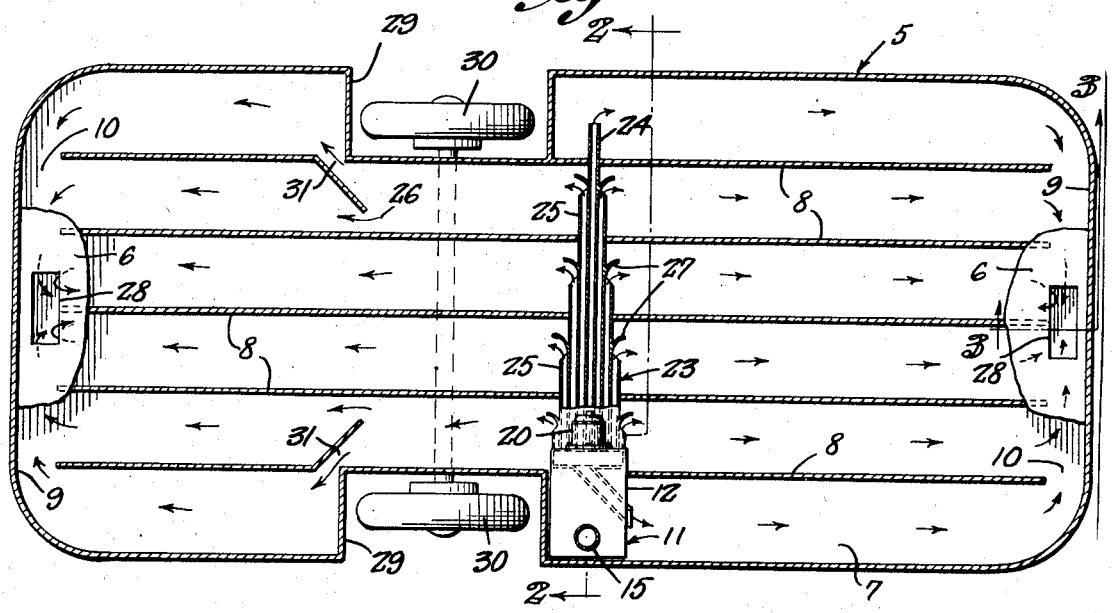
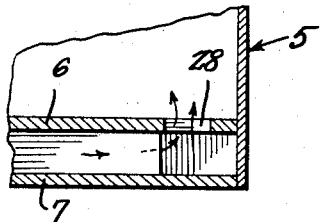
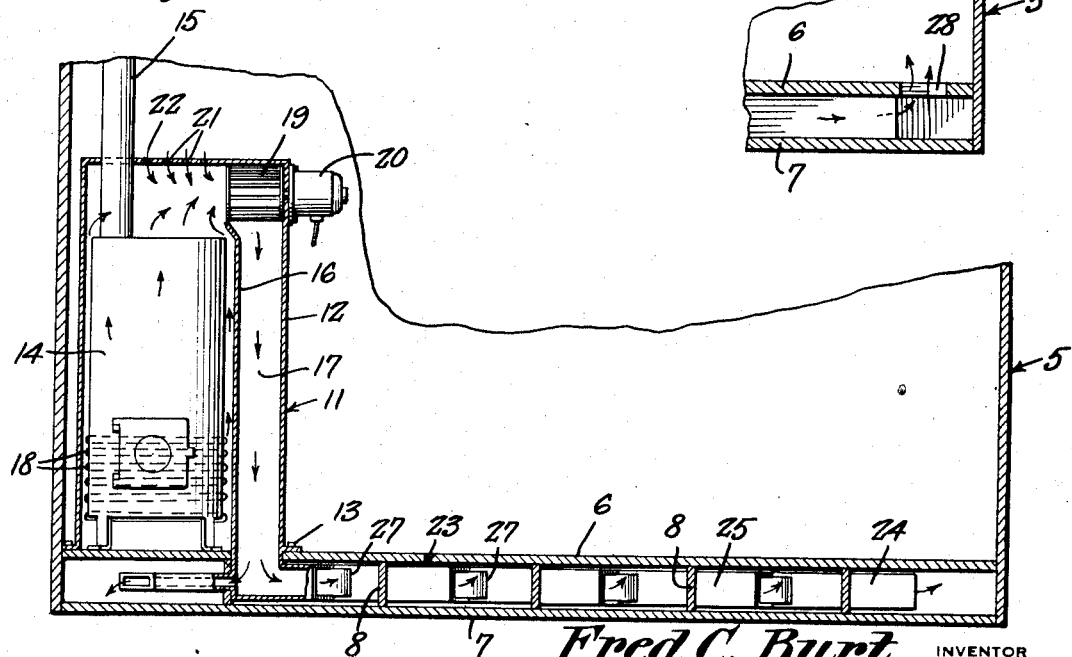
Fred C. Burt, INVENTOR Patented Feb. 17, 1942

2,273,176

UNITED STATES PATENT OFFICE 2,273,176

FLOOR HEATER

Fred C. Burt, New Hudson, Mich.

Application March 25, 1940, Serial No. 325,881

1 Claim. (Cl. 126—110)

The present invention relates to floor heaters and more particularly to heaters of this character used in automobile trailers and is an improvement on my copending application Serial No. 282,243 filed June 30, 1939, and issued April 2, 1940, No. 2,195,691.

The primary object of the invention resides in the provision of a heater of this character embodying means for directing cold air from the interior of the trailer into the heater and additional means for directing the heated air into distributing means whereby the distributed air will heat the floor of the trailer and at the same time maintain an even temperature within the trailer.

Another object of the invention is to provide a heater having the above characteristics including improved means for assuring complete distribution of the heated air whereby substantially the entire floor area of the trailer will be maintained in a heated condition.

A further object of the invention resides in the provision of a heater adapted to be positioned within the interior of a trailer or the like, the side walls thereof being formed with louvres through which cold air from the interior of the trailer will be directed into the heater and rise upwardly therethrough whereupon a blower will direct the heated air into a distributing means, said blower having a greater capacity than the heated air rising from the heater so that additional air will be drawn through the upper end of the heater casing from the interior of the trailer to be mixed with the heated air. By this method a relatively warm air is circulated through the floor of the vehicle instead of a substantially hot blast of air thereby tending to maintain an even temperature in the trailer.

The invention will be fully and comprehensively understood from a consideration of the following detailed description when read in connection with the accompanying drawing which forms a part of the application.

In the drawing:

Figure 1 is a horizontal sectional view taken through a trailer body and illustrating the floor heating structure in accordance with the present invention.

Figure 2 is a sectional view taken substantially on line 2—2 of Figure 1.

Figure 3 is a fragmentary detail sectional view taken substantially on line 3—3 of Figure 1.

Referring to the drawing for a more detailed description thereof, a trailer body of conventional construction is generally designated by the reference numeral 5, the same being formed with a main floor 6 and sub-floor 7, said sub-floor being uniformly spaced from the main floor. Disposed longitudinally of the body 5 and arranged in spaced parallel relation between the main and sub-floors, respectively, are a plurality of vertically disposed partitions 8, said partitions being attached by any desired means. The space between the partitions 8 represents circulating flues having communication with each other through which heated air from the heater is directed for maintaining the floor of the trailer in a heated condition and at the same time maintain an even temperature within the trailer as will be hereinafter apparent. As more clearly shown in Figure 1 of the drawing, the partitions 8 do not join the end walls 9 of the trailer body but terminate at a predetermined distance therefrom so as to provide spaces 10 through which the heated air is directed, the air following the direction of the arrows.

Mounted interiorly of the body 5 on the main floor 6 and rising vertically therefrom is a heater generally designated by the reference numeral 11, said heater comprising a casing 12 secured by any desired means as indicated at 13 to the floor 6 within which is supported a heater proper 14 of conventional construction. A flue 15 extends vertically from the heater 14 for carrying off heated gases therefrom. A vertically disposed partition 16 is mounted between one end wall of the casing 12 and the heater 14, the space 17 therebetween forming a conduit for heated air being forced from said heater.

The heater 14 includes the use of a series of louvres 18 through which relatively cold air will be drawn into the heater from the interior of the trailer body, said air being heated and rising vertically from the heater to be forced into the conduit space 17 by means of a blower 19. As more clearly shown in Figure 2 of the drawing, the blower 19 is operated by means of an electric motor 20, the same being mounted in the end wall 12 adjacent the top end of the casing. Current for operating the motor 20 is supplied from a battery or other source of supply. However, in accordance with the present invention the blower 19 has a greater capacity than the amount of heat rising from the heater and it will, therefore, draw in additional air through the openings 21 formed in the top end of the casing as indicated by the arrows 22, the air drawn from the interior of the trailer body being relatively cool and when mixed with the heated air rising upwardly from the heater, will substantially reduce the temperature thereof so that a relatively warm air will be discharged through the conduit into a distributing means, which means will be hereinafter described. In other words, the air rising vertically from the heater 14 if fed directly into the space between the main and sub-floors, respectively, would maintain the interior of the trailer body in an overheated condition, but since the blower also draws into the heater casing relatively cooler air, there will be provided a relatively warm air which when distributed throughout the trailer body will tend to maintain a desirable even temperature therein.

Disposed transversely with relation to the partitions 8 between the floors 6 and 7, respectively, and extending from the heater casing 12 is a distributor generally designated by the reference numeral 23, said distributor comprising a central flue or conduit 24 for directing air to the opposite side of the trailer body and a series of relatively shorter flues or conduits 25 communicating with the spaces between the partitions for the distribution of hot air from the heater 14 into said spaces whence it will flow laterally from the distributing conduits in opposite directions following the path indicated by the arrows 26. The discharge outlets of the flues 25 are formed with outwardly curved deflectors or baffles 27 which direct the heated air laterally in opposite directions from the group of flues. As is readily apparent, the heated air being directed through the entire floor area of the trailer between the main and sub-floors, the main floor will be maintained in a heated condition at all times. The heated air after travelling through the spaces between the partitions 8 will be delivered through heating registers 28 disposed at each end of the trailer body and mounted in the main floor 6. In this manner, the main floor 6 will be maintained heated and also the interior of the trailer body will be uniformly heated. By the arrangement hereinabove set forth, there will be a very small degree of difference in temperature within the trailer body 5 adjacent the ceiling thereof and adjacent the floor 6.

The trailer body 5 has its side walls thereof recessed as indicated at 29 for accommodating the wheels 30 and in view thereof baffle openings 31 are provided adjacent the recessed portion for assuring free circulation of heated air throughout the entire area of the trailer. In other words, the space adjacent the side and end walls of the trailer body will be as uniformly heated as the centralmost area of the body.

From the above description when taken in connection with the accompanying drawing, it will be readily apparent that there is provided a heater that will assure a uniform heating of the floor of the trailer as well as the entire space within the trailer body. Overheating of the trailer floor or the interior thereof is at least largely precluded by the manner in which the air is mixed prior to its distribution.

Also it will be understood, of course, by those skilled in the art that variations in the hereinabove described device involving the substitution of substantial equivalents for the devices described are intended to be comprehended within the spirit of the present invention and that the invention is capable of extended application and is not confined to the exact showing of the drawing nor to the precise construction described and, therefore, such changes and modifications may be made therein as do not affect the spirit of the invention nor exceed the scope thereof as expressed in the appended claim.

What is claimed is:

A heater for trailers and the like comprising a casing having a vertical partition extending therethrough from the bottom to a point short of the top of the casing, the said partition dividing the interior of the casing to form a heating chamber and a discharge duct opening at the bottom of the casing, the top of the casing above the heating chamber having a plurality of air inlet apertures, a heater mounted within the heating chamber of the casing having its top spaced below the top of the chamber, and a blower mounted within the casing at the top of the discharge duct operative to draw heated air from the heating chamber and air through the inlet apertures in the top thereof and force the said air downwardly through the duct and outwardly through the bottom outlet therein.

FRED C. BURT.